(12) United States Patent
Fangmeyer et al.

(10) Patent No.: US 6,523,467 B2
(45) Date of Patent: Feb. 25, 2003

(54) METHOD FOR MEASURING ENGRAVING CUPS

(75) Inventors: Dieter Fangmeyer, Westensee (DE); Olaf Broer, Kiel (DE)

(73) Assignee: Heidelberger Druckmaschinen Aktiengesellschaft, Heidelberg (DE)

( * ) Notice: Subject to any disclaimer, the term of this patent is extended or adjusted under 35 U.S.C. 154(b) by 273 days.

(21) Appl. No.: 09/737,055

(22) Filed: Dec. 14, 2000

(65) Prior Publication Data

US 2001/0015142 A1 Aug. 23, 2001

(30) Foreign Application Priority Data

Dec. 17, 1999 (DE) .......................... 199 60 922
Nov. 7, 2000 (DE) .......................... 100 55 030

(51) Int. Cl.⁷ ................................ B41F 1/07
(52) U.S. Cl. .................. 101/32; 101/483; 358/3.29; 358/406; 382/203
(58) Field of Search ................ 101/32, 211, 484, 101/486; 358/3.29, 1.9, 3.09, 406; 382/203

(56) References Cited

U.S. PATENT DOCUMENTS

| | | | |
|---|---|---|---|
| 3,983,319 A | * | 9/1976 | Moe et al. ............... 358/302 |
| 4,944,593 A | * | 7/1990 | Kalstroem et al. ....... 356/626 |
| 5,163,368 A | * | 11/1992 | Pensauecchia et al. ... 101/136 |
| 5,181,257 A | * | 1/1993 | Steiner et al. ............ 101/211 |
| 5,329,381 A | * | 7/1994 | Payne ..................... 358/3.29 |
| 5,602,972 A | * | 2/1997 | Hada et al. .............. 358/3.29 |
| 5,617,217 A | * | 4/1997 | Brewer .................... 358/3.29 |
| 5,621,533 A | * | 4/1997 | Holowko et al. ......... 358/3.29 |
| 5,652,804 A | * | 7/1997 | Bronstein et al. ........ 382/141 |
| 5,671,063 A | * | 9/1997 | Auberry et al. .......... 358/3.29 |
| 5,808,749 A | * | 9/1998 | Holowko .................. 358/3.29 |
| 5,810,396 A | * | 9/1998 | Kurata et al. ............. 283/93 |
| 5,828,464 A | * | 10/1998 | Yoshida et al. .......... 358/3.79 |
| 5,831,746 A | * | 11/1998 | Seitz ........................ 358/329 |
| 6,362,899 B1 | * | 3/2002 | Flannery et al. .......... 358/1.9 |

FOREIGN PATENT DOCUMENTS

| | | |
|---|---|---|
| DE | 25 08 734 | 12/1976 |
| WO | WO 94/19900 | 1/1994 |
| WO | WO 98/55302 | 10/1998 |

OTHER PUBLICATIONS

Spracherkennung und Sprachsynthese für Dienste von Nebenstellenanlagen—Mulia—vol. 59, No. 3 1985.
Sprachgesteuerter Rufnummerngeber—Elektrisches Nachrichtenwesen, vol. 59, No. 3 1985.
Produktschau—Telekommunikationsanlagen—Bd. 46 1993 (12).
Library of Congress—Gonzalez, Rafael C., Digital Image Processing.
Library of Congress Haykin, Simon—Adaptive Filter Theory—1996 Prentice Hall.
Digitale Bildverarbeitung/ Bernd Jähne Springer 4., vollst neuberarb Aufl 1997.
Karl Bosch Elementare Einführung in die angewandte Statistik 4., vieweg studium.
"Willi Törnig Peter Spellucci"—Numerische Mathematik für Ingenieure und Physiker Band 2: Numerische Methoden der Analysis Springer Verlag 1990.

* cited by examiner

Primary Examiner—Eugene H. Eickholt
(74) Attorney, Agent, or Firm—Schiff Hardin & Waite (57) ABSTRACT

In a method for measuring cups given the engraving of printing cylinders in an electronic engraving machine, an engraver of an engraving member engraves cups into a printing cylinder. The geometric dimensions of the cups represent actual hue values. A video image of the cups is picked up. The contour of a cup is determined in the video image and the geometric dimensions of the cup are determined in that the cup contour is measured. For this purpose, the cup contour in the picked up video image is smoothed by a simulation with a spline function or a general polynomial function, and the geometric dimensions of the cup are determined on the basis of the smoothed cup contour. The determined geometric dimensions are the transverse diagonal, the longitudinal diagonal, the through-cut, the web width, the cup surface or the cup volume.

34 Claims, 4 Drawing Sheets

METHOD FOR MEASURING ENGRAVING CUPS

BACKGROUND OF THE INVENTION

The invention relates to the field of the electronic reproduction technology and relates to a method for measuring cups given the engraving of printing cylinders in an electronic engraving machine.

DE-C-25 087 34 discloses an electronic engraving machine for engraving printing cylinders. An engraving member having an engraver, which is controlled by an engraving control signal, as a cutting tool moves in an axial direction along a rotating printing cylinder. The engraver cuts a sequence of cups into the surface area, the cups being arranged in a printing raster. The engraving control signal is acquired by superimposition of a periodical raster signal with image signal values representing the hue values between "light" (white) and "dark" (black). While the raster signal effects an oscillating lifting motion of the engraver for engraving the cups arranged in the printing raster, the image signal values determine the geometric dimensions of the engraved cups corresponding to the hue values to be reproduced.

The engraving control signal must be calibrated, so that the cups engraved into the printing cylinder correspond to the hue values that are prescribed by the image signal values. For this purpose, a test engraving is carried out prior to the engraving, whereby cups are engraved for prescribed hue values, for example for the hue values "light" and "dark". Subsequent to the test engraving, the geometric actual dimensions of the engraved cups, such as the transverse diagonals and the longitudinal diagonals, are measured. The geometric actual dimensions are compared to the geometric set dimensions of the cups, which represent the hue values prescribed for the test engraving. Adjustment values are acquired from the comparison, by means of which the engraving control signal can be calibrated such that the cups that are actually generated in the later engraving correspond to the cups required for an engraving with the correct hue value.

It is already known from WO-A-94/19900 to measure cups that are engraved during a test engraving in a video image picked up by a video camera.

WO-A-98/55302 discloses the determination of the geometric dimensions of an engraved cup in a video image on the basis of the cup contour with the aid of an electronic measuring line that can be displaced in the video image. For this purpose, a contour search is initially performed, whereby the image points situated on the cup contour are marked as contour points. Subsequently, the desired geometric dimensions are determined as a number of image points between relevant contour points.

In practical operation, the surface area of an engraved printing cylinder can often have defects such as scratches, which, during the contour search, are incorrectly interpreted in the video image as real contour points of a cup—as far as they are situated in the area of cup edges—so that faulty measurements result during the automatic cup measuring.

SUMMARY OF THE INVENTION

It is an object of the invention to improve a method for measuring cups during the engraving of printing cylinders in an electronic engraving machine, preferably for measuring cups generated during a test engraving, such that a secure and precise automatic determination of the geometric dimensions of engraved cups is assured despite present defects on the printing cylinder.

According to the method of the invention for measuring cups given engraving of printing forms in an electronic engraving machine, an engraving member engraves cups into a printing form. Geometric dimensions of the cups represent actual hue values. A A video image is produced of at least one engraved cup. A contour of the engraved cup is searched for in the video image. The cup contours found in the video image are smoothed. The geometric dimensions of the cups are determined on the basis of the smooth cup contour in order to avoid erroneous measurements.

The invention is subsequently explained in greater detail on the basis of FIGS. 1 through 6.

DESCRIPTION OF THE PREFERRED EMBODIMENTS

Figure 1:
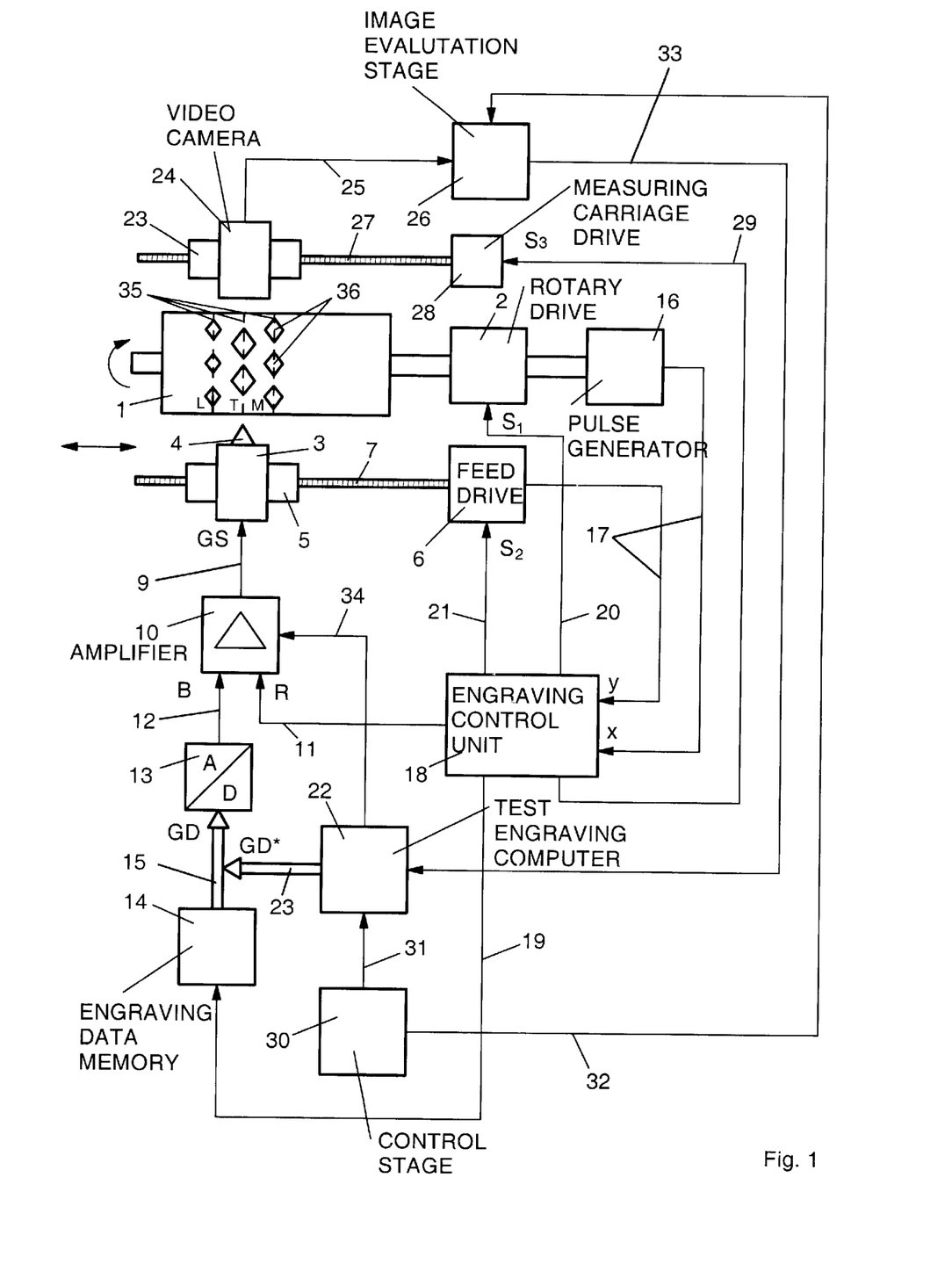
FIG. 1 is a basic exemplary embodiment for an electronic engraving machine for engraving printing cylinders.

FIG. 1 shows a block diagram of an electronic engraving machine for engraving printing cylinders. For example, the engraving machine is a HelioKlischograph of the company Hell Gravure Systems GmbH, Kiel, Germany.

A printing cylinder 1 is driven by a rotary drive 2. An engraving member 3 having an engraver 4 as a cutting tool is mounted onto an engraving cart 5, which can be moved in axial direction of the rotating printing cylinder 1 with the aid of a spindle 7 driven by a drive 6.

The engraver 4 that is controlled by an engraving control signal GS, according to engraving lines, cuts a sequence of cups, which are arranged in a printing raster, into the surface area of the rotating printing cylinder 1, while the engraving cart 5 having the engraving member 3 moves along the printing cylinder 1 in advance direction.

The engraving control signal GS on a line 9 is formed in an engraving amplifier 10 by superimposition of a periodical raster signal R on a line 11 with image signal values B on a line 12, which represent the hue values of the cups to be engraved between "light" (white) and "dark" (black). While the periodical raster signal R effects an oscillating lifting motion of the engraver 4 for engraving the cups arranged in the printing raster, the image signal values B determine the respective geometric dimensions of the engraved cups corresponding to the hue values to be reproduced, such as the transverse diagonals, the longitudinal diagonal, the through-cut, the web width, the cup surface or and the cup volume.

The image signal values B are acquired in a D-A converter 13 from engraving data GD. The engraving data GD are deposited in an engraving data memory 14, from which they are read out according to engraving lines and are supplied to the D-A converter via a data bus 15.

The engraving locations of the cups, which are fixed by the printing raster, on the surface area of the printing cylinder 1 are defined by the location coordinates (x, y) of a coordinate system allocated to the surface area of the printing cylinder 1, whereby the x-axis is oriented in the axial direction and the y-axis in the circumferential direction of the printing cylinder 1. The translation drive 6 generates the x-location coordinates and an electronic pulse generator 16 mechanically coupled with the printing cylinder 1 generates the y-location coordinates of the engraving locations. The location coordinates (x, y) are supplied via lines 17 to an engraving control unit 18.

The engraving control unit 18 generates the raster signal R with the frequency on line 11 required for generating the engraving raster, read addresses for the engraving data memory 14 dependent on the xy-location coordinates of the current engraving locations on an address line 19, as well as control signals for controlling and synchronizing the engraving sequence.

A first control signal $S_1$ for the rotary drive 2 on a line 20 adjusts the circumferential speed of the printing cylinder 1, which is necessary for generating the printing raster. A second control signal $S_2$ at the feed drive 6 on the line 21 adjusts the translation step width that is necessary for generating the printing raster and controls the translation movement of the engraving carriage 5 with the engraving organ 3 during the engraving.

For engraving cups with respect to a test engraving prior to the printing form production, the engraving machine has a test engraving computer 22, which supplies the required engraving data GD* via a data bus 23 to the D-A converter 13. Each engraving date GD* represents the fixed set hue value of a cup or its geometric set dimensions.

In order to pick up a video image of the engraved cups, a measuring carriage (23 is present, which can be displaced in the axial direction of the printing cylinder 1 and which comprises a suitable measuring unit, for example in the form of a video camera 24, which is connected via a line 25 to an image evaluation stage 26 for measuring the cups in the video image.

The measuring cart 23 can be automatically moved onto the required axial measuring position via a spindle 27 of a measuring carriage drive 28. The measuring carriage drive 28 is controlled proceeding from the engraving control unit 18 by a further control signal $S_3$ on a line 29.

A control stage 30 supplies the defaults, which are necessary for the test engraving and the following measuring of the cups, via a line 31 to the test engraving computer 22 and to the image evaluation stage 26 via a line 32. The image evaluation stage 26, via a line 33, transmits the measuring results as geometric actual dimensions to the test engraving computer 22. Adjustment values for calibrating the engraving control signal GS are acquired in the test engraving computer 22 in that prescribed geometric set dimensions are compared to measured actual dimensions; said adjustment values are supplied to the engraving amplifier 10 via a line 34. On the basis of the determined adjustment values, the engraving control signal GS is calibrated in the engraving amplifier 10 such that the cups, which are actually generated during the later engraving of the printing cylinder 1, correspond to the cups required for an engraving with the correct hue value.

For purposes of engraving the cups, the test engraving computer 22 calls, for example, the engraving data GD* for the set hue values "dark", "light" and for at least one "middle hue" between "light" and "depth". The called engraving data GD* are converted into the engraving control signal GS. The engraving organ 3, in adjacent engraving lines, respectively engraves at least one cup 36 for "light" (L), "depth" (T) and "middle hue" (M) on the printing cylinder 1.

The video image of the cups 36 picked up by the video camera 24 is further processed in the image evaluation stage 26. The video image is composed of a plurality of picture elements, whose position in the video image is defined by the location coordinates of an orthogonal coordinate system, which is oriented in the direction of the engraving lines 35 and perpendicular thereto. A video date (VD) of 8 bit, for example, which characterizes the respective gray scale value, is allocated to each picture element in the video image, so that a total of 256 gray scale values can be differentiated between "black" (VD=0) and "white" (VD=255).

Subsequently, an automatic contour search is carried out in a binarized video image, whereby the picture elements exhibiting the highest contrast with respect to their environment are marked as contour points that belong to a cup contour. The contour points that are found in this way are stored together with their location coordinates for the further processing.

In order to accelerate the contour search, it has proven expedient to select a cup to be measured within the test engraving, to place a search field around the selected cup and to carry out the automatic contour search only within the search field.

Such methods for the contour search are prior art and are explained in greater detail in Bernd Jaehne: "Digitale Bildverarbeitung", Springer Verlag, $4^{th}$ edition, 1997 or in Rafael C. Gonzalez: "Digital Image Processing", Addison-Wesley, 1992, for example.

As is has already been mentioned, the surface area of an engraved printing cylinder 1 can have defects. For example, such defects are scratches, material remainders that are pressed back into the engraved cups or blow-outs at cup contours due to a defective engraver. These defects—as far as they are situated in the region of cup edges or cup contours—can be interpreted as real contour points of a cup contour during the automatic contour search in the video image, although they belong to a defect and therefore are faulty contour points of the cup contour. Disadvantageously, erroneous measurements can be the result of the incorrect contour points given the automatic cup measuring.

The method of the invention basically avoids such erroneous measurements in that the cup contours of cups to be measured in the video image, which are uneven as a result of the defects, are cleaned or smoothed by filtering and the cups are subsequently measured at the cleaned or smoothed cup contours.

The elimination or smoothing can be carried out by a low-pass filtering by means of an IIR filter or FIR filter, whereby the contour points represent the scanning sequence.

Another type of cleaning or smoothing can be carried out in that an uneven cup contour is simulated by at least one mathematical function, which extends through real contour points as much as possible.

The selection of the suitable contour points thereby occurs by filtering the contour points of the cup, which are determined during the contour search, in that real contour points that actually belong to a cup contour are determined and in that incorrect contour points that do not belong to a cup contour are determined and in that the incorrect contour points are not considered during the determination of the mathematical function or are considered with a lower weighting than the ones of the real contour points.

For example, spline functions—briefly called splines—polynomials or other functions such as sinus functions can be used as mathematical functions.

The individual method steps for measuring cups, whose uneven contours are simulated by mathematical functions for purposes of eliminating defects, are subsequently explained in greater detail on the basis of exemplary embodiments.

In a first and second exemplary embodiment, cup contours are simulated by spline functions $S(x)$.

Spline functions $S(x)$ or splines $S(x)$ are polynomials of n-th order that are put against one another in terms of intervals and that are steady at the connecting points (supporting locations) of the intervals. In order to simulate a cup contour, suitable contour points are fixed as supporting locations on the contour (first exemplary embodiment) or are automatically searched according to specific criteria, for example by minimizing error values (second exemplary embodiment). On the basis of the fixed supporting locations or automatically searched supporting locations, spline functions $S(x)$ are interpolated, preferably natural, cubic splines $S(x)$, namely polynomials of $3^{rd}$ degree.

First Exemplary Embodiment

In the first exemplary embodiment, the method steps [A] through [D] proceed as follows:

Method Step [A] "Determining Contour Areas"

In method step [A], it is determined whether the overall contour of a cup is approximated by a spline function $S(x)$ or whether the overall contour is divided into contour sections and each contour section is to be approximated by a corresponding spline function $S(x)$.

In practical operation, it has proven advantageous to divide the cup to be measured by the corresponding engraving line into a right cup half and into a left cup half with respectively one right contour section and one left contour section and to calculate a corresponding spline function $S(x)$ for each contour section.

Figure 2:
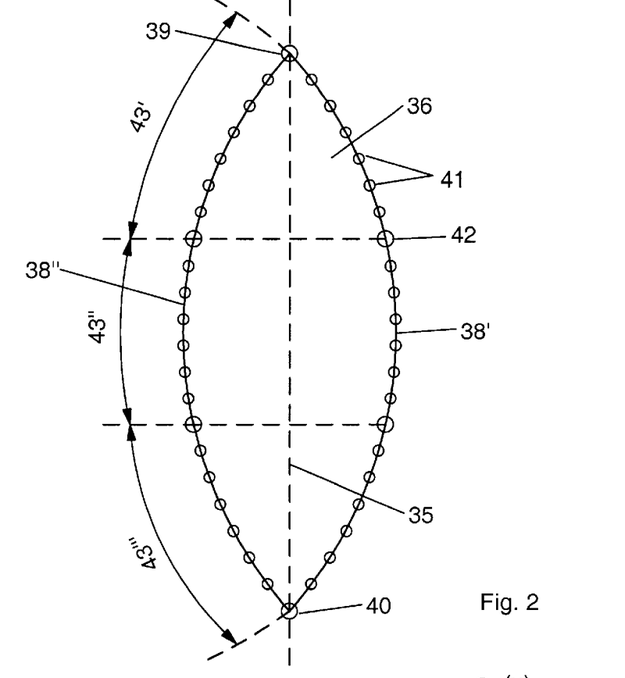
FIG. 2 is a cup contour having contour points and supporting locations.

As a section of a video image, FIG. 2 shows a cup 36 to be measured, whose overall contour 38 is divided into two contour sections 38', 38" by the corresponding engraving line 35, whereby the two intersecting points between the overall contour 38 and the engraving line 35 respectively form the starting point 39 and the end point 40 of the two contour sections 38', 38".

Method Step [B] "Determining the Number of Supporting Locations"

In method step [B], the expedient number of supporting locations is determined on the overall contour or, respectively, on each contour section of the cup to be measured in order to calculate the splines $S(x)$.

The number of supporting locations for calculating the splines $S(x)$ essentially depends on the contour curve, on the hue value represented by the cup and on the raster parameters of the utilized printing raster. For example, a cup without a through-cut has a closed contour curve and a cup with a through-cut has an open contour curve. The type of the contour curve determines the number of turning points in the splines $S(x)$ to be calculated and the number of turning points determines the expedient number of supporting locations.

Method step [C] "Acquiring Splines $S(x)$"

In a step [C1], the contour points, which are to be utilized as supporting locations for the interpolation of the splines $S(x)$—whereby the supporting locations are determined in the first exemplary embodiment such that they, at equal distances, are distributed over the overall contour 38 or the two contour sections 38', 38" of the cup 36 to be measured (as this is shown in FIG. 2)—are initially determined from the contour points previously determined by the contour recognition on the overall contour 38 or on each contour section 38', 38" of a cup to be measured.

In FIG. 2, each contour section 38', 38" of the cup 36 comprises 16 contour points 41, for example, whereby four contour points 41 thereof are fixed as supporting locations 42 being equally spaced from one another. The first supporting spot 42 is situated in the starting point 39 and the fourth supporting point 42 in the end point 40 of the contour sections 38', 38". Intervals 43 arise between the supporting locations 42; in the shown example, three intervals 43', 43", 43'" per contour section 38', 38" with respectively 6 contour points 41.

Given the determination of the supporting locations 42, it must be taken into consideration that erroneous contour points that are conditioned by defects may have been acquired during the previous contour search in addition to real contour points 41. Therefore, the selection should be made such that only real contour points 41 are optimally used as supporting locations 42 and erroneous contour points 41 are eliminated. As a result thereof, it is expedient to basically keep the number of supporting locations 42 as low as possible in order to filter out interferences, which are generally of high frequency. The splines $S(x)$ then act as a low-pass filter.

In a step [C2], the splines $S(x)$ for the overall contour 38 or for the individual contour sections 38', 38') of the cup 36) to be measured are calculated on the basis of the supporting locations 42 determined in step [C1].

Splines, their calculation on the basis of supporting locations and their utilization for the approximation of curves are known per se and are explained in greater detail in W. Toerning, P. Spelucci: "Numerische Mathematik fuer Ingenieure und Physiker", volume 2, Springerverlag, 1990, for example.

After method step [C] has been completed, the uneven cup contour is simulated by at least one spline function $S(x)$ upon elimination of defects.

If the symmetry of a cup can be utilized, it is sufficient to calculate the spline function $S(x)$ only for one cup half and to mirror the calculated spline function $S(x)$ for the simulation of the other cup half at the symmetry axis.

In order to reduce the calculating time, it can be occasionally expedient to determine the spline function $S(x)$ merely for the areas of a cup contour, which are actually required for the cup measuring.

Method Step [D] "Cup Measuring by Means of the Splines $S(x)$"

In the completing method step [D], the desired geometric dimensions of a cup 36 are determined on the basis of the spline functions $S(x)$ calculated in method step [C].

Figure 3:
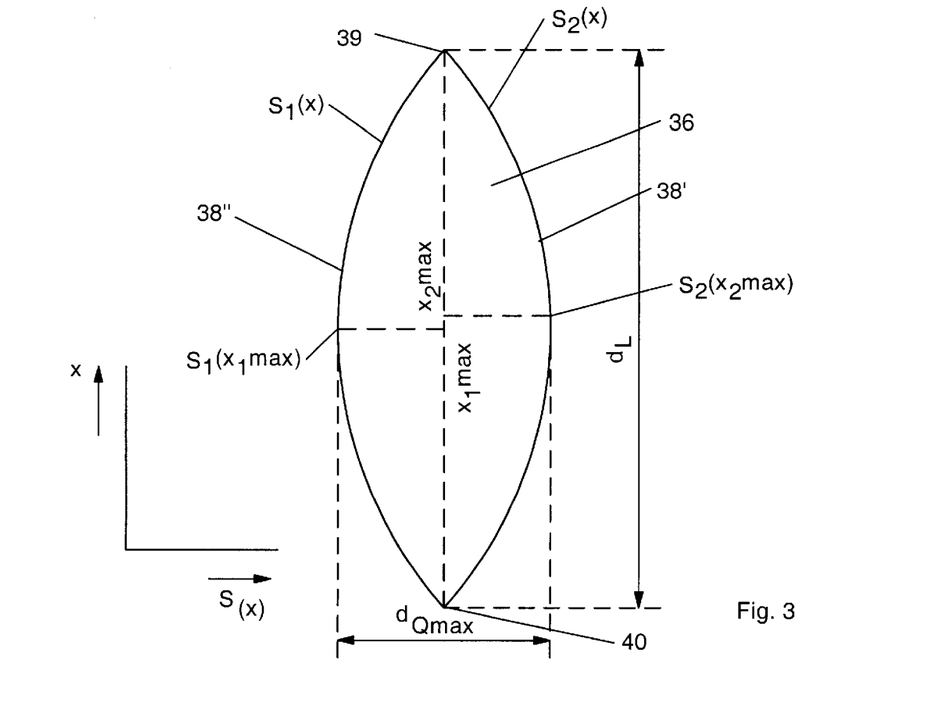
FIG. 3 shows a graphic chart for measuring the longitudinal diagonal and the transverse diagonal of a cup.

The maximal transverse diagonal $d_{Qmax}$ is the maximal expanse of the cup surface perpendicular to the X-direction. For determining the maximal transverse diagonal $d_{Qmax}$, the maximal function values $S_1(X_{max})$ and $S_2(X_{max})$ of the two opposing splines $S_1(x)$ and $S_2(x)$ of the cup 36 to be measured are calculated at the locations $X_{1max}$ and $X_{2max}$ and the maximal transverse diagonal $d_{Qmax}$ is acquired by difference forming of the maximal function values $S_1(x_{1max})$ and $S_2(x_{2max})$ according to the following equation:

$$d_{Qmax} = S_2(x_{2max}) - S_1(x_{1max})$$

Since $S_1(x_{1max})$ is negative, the difference forming corresponds to the addition of the absolute values of the function values $S_1(x_{1max})$ and $S_2(X_{2max})$.

An arbitrary transverse diagonal $d_Q$ of the cup 36 to be measured can be calculated by difference forming of the corresponding function values at a location x.

The longitudinal diagonal $d_L$ is the maximum expanse of the cup surface in the X-direction. The longitudinal diagonal $d_L$ simply results from the distance of the intersecting points 39, 40 of the two opposing splines $S_1(x)$ and $S_2(x)$ of the cup 36 to be measured in the X-direction.

FIG. 3 shows a graphic chart for determining the transverse diagonal $d_{Qmax}$ and the longitudinal diagonal $d_L$ of an unsymmetrical cup 36 to be measured. The contour sections 38, 38" of the cup are simulated by two splines $S_1(x)$ and $S_2(x)$, whose maximal values, which are offset to one another, are situated at the locations $x_{1max}$ and $x_{2max}$.

Figure 4:
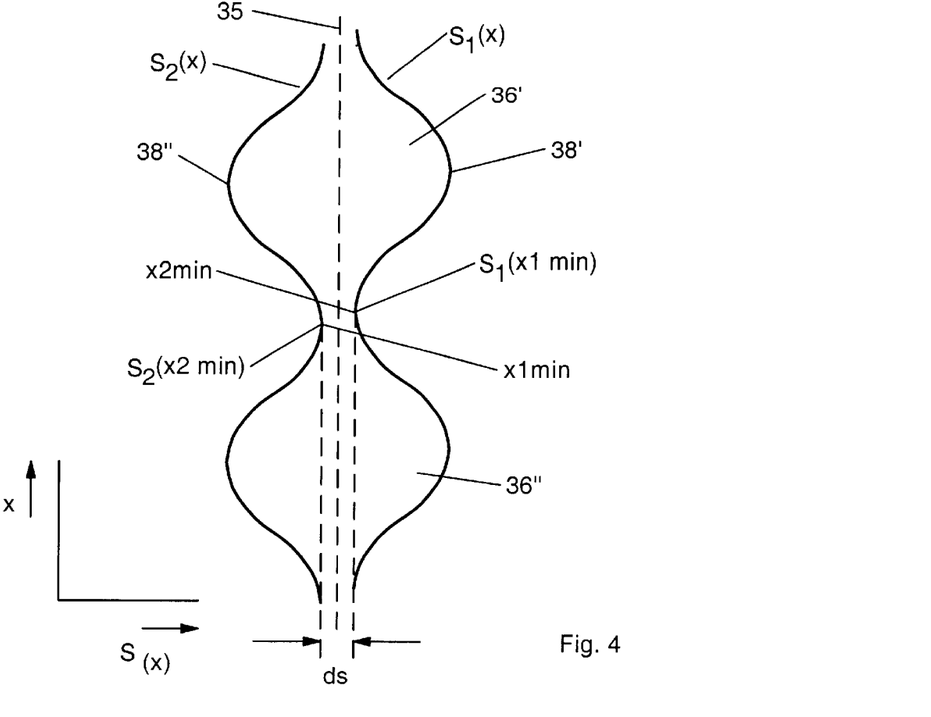
FIG. 4 illustrates a graphic chart for measuring a through-cut.

The through-cut $d_s$ is the width of the engraving channel in X-direction, which connects two deep cups engraved on an engraving line 35 to one another. The through-cut results from the difference forming of the minimal function values $S_1(x_{1min})$ and $S_2(x_{2min})$ according to the following equation:

$$ds = S_2(x_{2min}) - S_1(x_{1min})$$

FIG. 4 shows a graphic chart for determining the through-cut $d_s$ of two adjacent cups 36', 36" that are engraved on an engraving line 35. The contour sections 38', 38" of the cups 36', 36" are simulated by two splines $S_1(x)$ and $S_2(x)$, whose minimal values $S_1(x_{1min})$ and $S_2(x_{2min})$, which are offset to one another, are situated at the locations $x_{1min}$ and $x_{2min}$.

Figure 5:
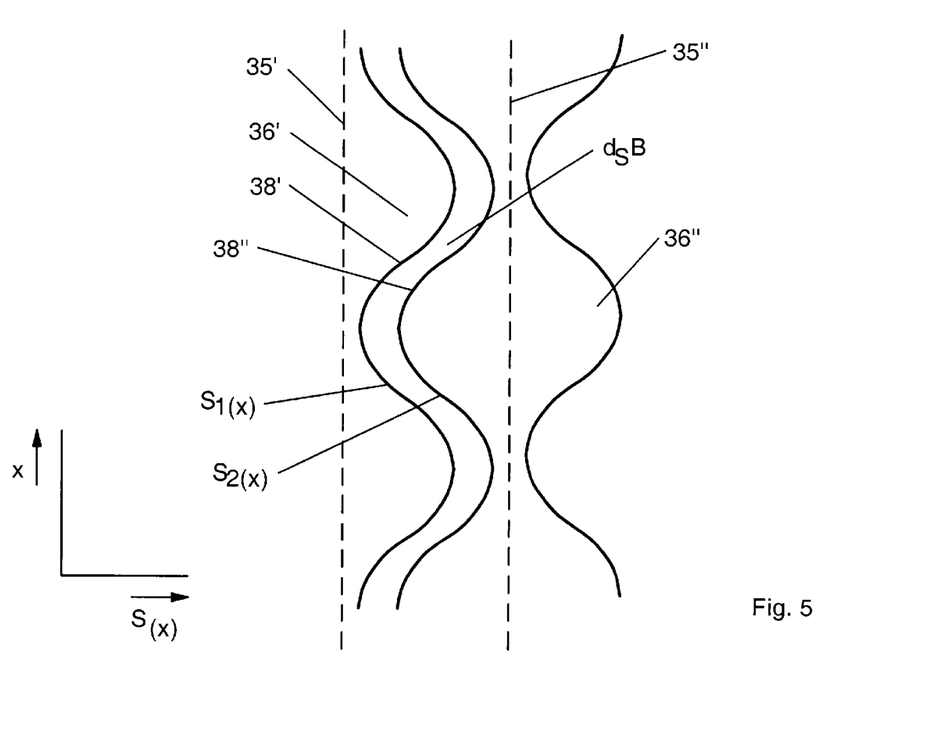
FIG. 5 is a graphic chart for measuring a web width.

The web width $d_{SB}$ is the width of the material, which remained between two deep cups 36', 36" engraved on adjacent engraving lines 35, 35". In the most simple case, a distance function $A(x)$, for determining the minimal web width $d_{SB}$, is initially determined from the distances of the splines $S_1(x)$ and $S_2(x)$ of the two cups (36', 36") in the coordinate direction according to the equation:

$$A(x) = S_2(x) - S_1(x)$$

The desired minimal web width dSB then results as minimal value of the distance function $A(x)$.

FIG. 5 shows a graphic chart for determining the web width $d_{SB}$ between two neighboring cups 36', 36", which are engraved on adjacent engraving lines 35', 35". The opposing contour sections 38', 38" of the two cups 36', 36" are simulated by two splines $S_1(x)$ and $S_2(x)$, whose distance from one another is defined by the distance function $A(x)$.

If the web width $d_{SB}$ is to be calculated from the distances in the normal direction of the splines $S_1(x)$ and $S_2(x)$ that are opposite to one another, the normal line is initially calculated via the slope at a location $x_1$ of the one spline function $S_1(x)$ and the intersecting point $x_2$ between the normal line and the other spline function $S_2(x)$ is determined. In this case, the web width $d_{SB}$ results from the minimal value of the distance function according to the general equation:

$$A(X_i) = \sqrt{(\Delta S)^2 + (\Delta \gamma)^2}$$

Figure 6:
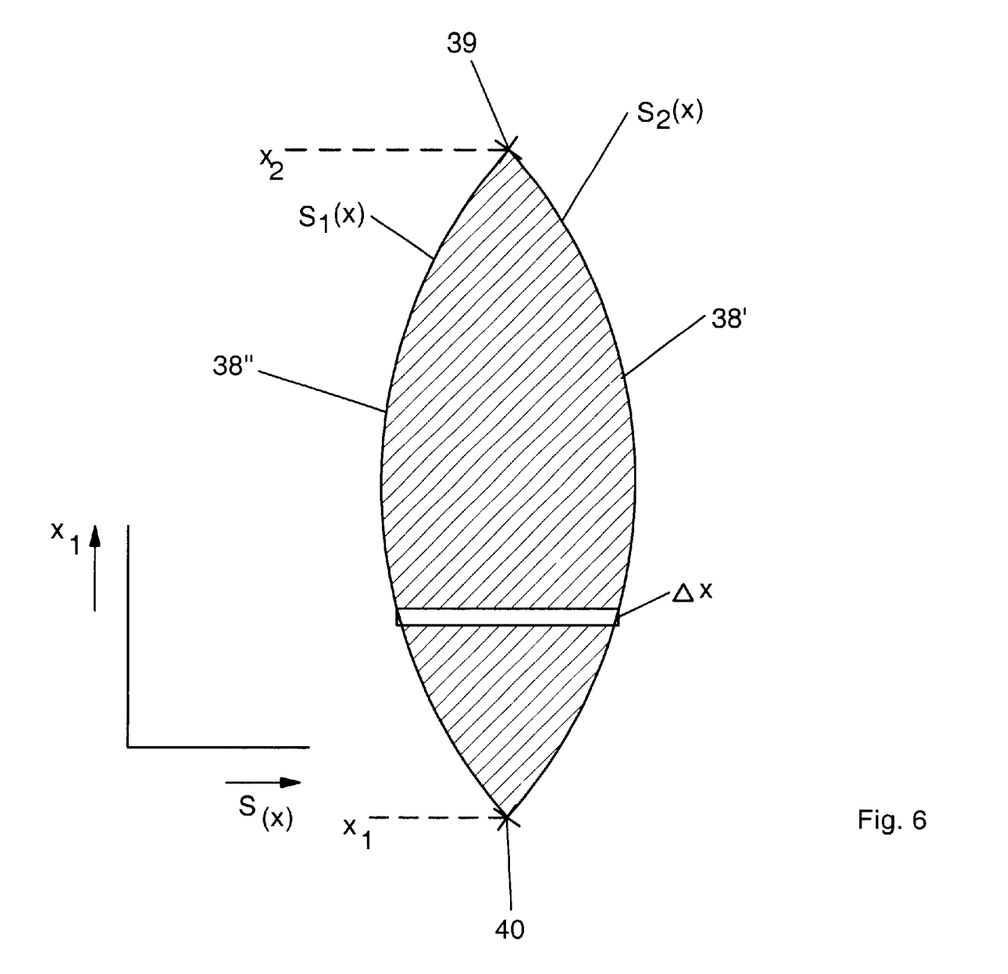
FIG. 6 shows a graphic chart for measuring a cup surface and a cup volume.

The surface F of a cup 36 results from the surface of two splines $S_1(x)$ and $S_2(x)$ being opposite to one another and having the intersecting points $x_1$ and $x_2$ according to the following equation:

$$F = \sum_{x1}^{x2} (S_1(x) - S_2(x)) \cdot \Delta \gamma$$

FIG. 6 shows a graphical chart for determining a cup surface. The contour sections 38', 38" of the cups are simulated by two splines $S_1(x)$ and $S_2(x)$, which cut in the points $x_1$ and $x_2$.

The volume V of a cup (36) results from the following equation:

$$V = \sum_{x1}^{x2} (S_1(x) - S_2(x))^2 \cdot \tan\delta/2 \cdot \Delta\gamma$$

whereby "$\delta$" is the cutting angle of the utilized engraver.

In the described first exemplary embodiment, the contour points 41, which serve as supporting points 42 for calculating the splines $S(x)$, have been merely fixed without checking whether the fixed contour points 41 are real or not real contour points 41. It can therefore be the case that incorrect contour points 41 are used as supporting locations 42 as well, so that erroneous measurements result during the cup measuring.

Although this course of action leads to a fast and accurate calculation of the contour simulation function, it is only suitable for measuring cups when there are no or uncritical defects or when only simple cup contours are to be simulated.

An improvement can be achieved in that—according to the second exemplary embodiment—only optimal supporting locations 42 are looked for or are selected according to specific criteria, for example, the minimization of error values.

Second Exemplary Embodiment

The method steps [A] through [D] proceed as follows:
Method Step [A] "Determining Contour Areas"
see first exemplary embodiment
Method Step [B] "Determining the Number of Supporting Locations"
see first exemplary embodiment
Method Step [C] "Determining the Splines"

In the second exemplary embodiment, the optimal supporting locations 42 for each contour section 38', 38" are selected step-by-step from the contour points 41 such that incorrect contour points are eliminated during the calculation of the splines or are considered at least with a lower weighting.

In a first step [C1], a first supporting spot selection is initially made, whereby the supporting locations 42 are fixed such that they—as in the first exemplary embodiment—are distributed equally spaced from one another over the overall contour 38 or over the two contour sections 38', 38" of the cup 36 to be measured, as shown in FIG. 2.

In a second step [C2], a first spline function $S_1(x)$ is calculated for each contour section 38', 38" by the supporting locations 42 of the first supporting locations selection.

In a third step [C3], the spacing errors between the interpolated spline function $S(x)$ and the actual contour $K(x)$ of the contour section 38', 38" are respectively determined in a contour section 38', 38" for all contour points 41 of the contour section 38', 38" in order to determine the quality of the supporting locations 42. The spacing errors that are determined for each individual contour point 41 are added up for each contour section 38', 38" and the added spacing errors are stored as error value $\sigma$ together with the spline function $S1(x)$ of the appertaining contour section 38', 38" calculated for the first supporting spot selection.

The error value $\sigma$ thereby results according to the general equation:

$$\sigma = \sum_{yi} |S(x) - K(x)|^m \qquad \sigma = \sum_{yi} |S(x) - K(x)|$$

In the explained example, the error square $\sigma_2$ is used as error value and results from the following equation:

$$\sigma^2 = \sum_{yi} (S(x) - K(x))^2$$

The calculation of such error values σ is known and is explained in detail in Haykin Simon: "Adaptive Filter Theory), Prentice Hall, $3^{rd}$ edition, 1996, for example, so that a detailed description can be foregone at this point.

In a fourth step [C4], a second supporting spot selection is made with new positions of the supporting locations 42, and the steps [C2] and [C3] are repeated for the second supporting spot selection.

In a fifth step [C4], the determined and added error squares $\sigma^2$ of the first and second supporting spot selection are compared to one another and the respectively smallest added error square $\sigma^2$ is stored together with the corresponding spline function S(x).

The steps [C2] through [C4] are routinely repeated given each new supporting spot selection. The spline function S(x) that belongs to the smallest determined error square $\sigma^2$ optimally simulates the cup contour and is then consulted for measuring the cup according to method step [D].

For example, a n-th supporting spot selection occurs in that the contour point 41 respectively following the contour point 41 of the preceding (n−1)-th supporting spot selection is selected step-by-step within each interval 43', 42", 43'".

In the example shown in FIG. 2, the contour points 41 that serve as supporting locations 42 are selected in the three intervals 43', 43", 43'" according to the following selection scheme, in which the respectively selected supporting locations 42 are marked with "x"

| | Contour points 1–12 | | | | | | | | | | | |
|---|---|---|---|---|---|---|---|---|---|---|---|---|
| | $1^{st}$ interval | | | | $2^{nd}$ interval | | | | $3^{rd}$ interval | | | |
| selection | 1 | 2 | 3 | 4 | 5 | 6 | 7 | 8 | 9 | 10 | 11 | 12 |
| 1 | X | | | | X | | | | X | | | |
| 2 | | X | | | | X | | | | X | | |
| 3 | | | X | | | | X | | | | X | |
| 4 | | | | X | | | | X | | | | X |

The sequence of the supporting spot selection in the individual intervals 43 is not limited to the described example.

If the largest error squares $\sigma^2$ are also determined for the contour points 41, the contour points 41 having the largest error squares $\sigma^2$ can be excluded from the beginning, in a further development of the method, as potential supporting locations 42 for calculating the splines S(x).

Method Step [D] "Cup Measuring by Means of the Splines" see first exemplary embodiment Third Exemplary Embodiment In a third exemplary embodiment, cup contours are simulated by polynomials P(x) in two method steps [A] and [B].

In a first method step [A], it is determined again whether the overall contour of a cup is to be approximated by a polynomial P(x) or whether the overall contour is divided into contour sections and each contour section is to be approximated by a polynomial P(x).

In a second method step [B], the overall contour or each contour section is then approximated, upon consideration of all contour points of the overall contour or of the respective contour section, by a polynomial of the form $P(x)=\Sigma a_i x^i$ with minimization of the error value σ.

A polynomial approximation, for example, is described in K. Bosch "Elementare Einfuehrung in die angewandte Statistik", $4^{th}$ edition, Viehweg Verlag, 1987, page 168 ff, under the catchword "Allgemeine Regressionskurven 2. Art".

In an advantageous embodiment of the method, the determined error values σ can be utilized at the same time for recognizing mechanically worn engravers or broken engravers, since uneven cup contours also arise given the engraving of cups by a worn engraver. If the error values σ exceed a fixed threshold value, for example, a signal can be generated, which displays or signalizes a engraver wear or, respectively, a engraver breakage.

Although various minor modifications might be suggested by those skilled in the art, it should be understood that our wish to embody within the scope of the patent warranted hereon all such modifications as reasonably and properly come with the scope of our contribution to the art.

We claim as our invention:

1. A method for measuring cups given engraving of printing forms in an electronic engraving machine, comprising the steps of:

engraving with an engraving member cups into a printing form, geometric dimensions of said cups representing actual hue values;

producing a video image of at least one engraved cup;

searching for a contour of the engraved cup in the video image;

smoothing the cup contour found in the video image; and determining the geometric dimensions of the cups on the basis of the smoothed cup contour in order to avoid erroneous measurements.

2. The method according to claim 1, wherein the cup contour is smoothed by filtering.

3. The method according to claim 1 the cup contour is smoothed by simulation by at least one mathematical function.

4. The method according to claim 1 wherein points that are probably situated on a cup contour are determined by a contour search in the video image, and a mathematical function is determined on the basis of the determined points.

5. The method according to claim 4 wherein real contour points that are actually situated on the cup contour are determined by filtering, and not erroneous contour points that do not belong to the cup contour, and the erroneous contour points are not at all considered during the determination of the mathematical function.

6. The method according to claim 4 wherein real contour points that are actually situated on the cup contour are determined by filtering, and not erroneous contour points that do not belong to the cup contour, and the erroneous contour points are considered with a low weighting regarding the real contour points.

7. The method according to claim 1, wherein the cup contour is divided into at least two contour sections, and a mathematical function is determined for each contour section.

8. The method according to claim 7 wherein the mathematical function is determined upon minimization of error values, which represent a measure for spacing errors between the respectively determined mathematical function and the contour points.

9. The method according to claim 1 wherein at least one spline function is used as a mathematical function for simulating a cup contour, and the spline function is interpolated as supporting locations upon utilization of contour points.

10. The method according to claim 9 wherein the contour points serving as supporting locations are prescribed.

11. The method according to claim 9 wherein the contour points serving as supporting locations are selected according to fixed criteria.

12. The method according to claim 9 wherein the contour points serving as supporting locations are selected upon minimization of error values, which represent a measure for the spacing errors between the respectively determined spline function and the contour points.

13. The method according to claim 9, wherein a number of contour points serving as supporting locations is fixed for at least one of per cup contour or per contour section.

14. The method according to claim 13 wherein the number of the contour points serving as supporting locations is fixed dependent on a form of the cup contour, and on at least one of a hue value represented by the cup and raster parameters of a utilized printing raster.

15. A method for measuring cups given the engraving of printing forms in an electronic engraving machine, comprising the steps of:
engraving with an engraving member cups into a printing form geometric dimensions of said cups representing actual hue values;
producing a video image of at least one engraved cup;
searching for a contour of an engraved cup in the video image;
determining the contour points that are likely to be situated on a cup contour by a contour search in the video image;
simulating the cup contour by at least one spline function, which is calculated by contour points serving as supporting locations; and
determining the geometric dimensions of the cup on the basis of the spline function in order to avoid erroneous measurements.

16. The method according to claim 15 wherein the cup contour is divided into at least two contour sections,
a number of contour points serving as supporting locations is prescribed per contour section;
the supporting locations are selected from the contour points of the contour sections for each contour section; and
the spline function is calculated by the selected supporting locations for each contour section.

17. The Method according to claim 15 wherein the contour points are selected such that the supporting locations exhibits a same distance from one another.

18. The method according to claim 15 wherein
the cup contour is divided into at least two contour sections;
a number of contour points serving as supporting locations is prescribed per contour section;
optimal supporting locations are selected from the contour points of the contour sections in each contour section; and
the spline function is calculated by optimal selected supporting locations for each contour section.

19. The method according to claim 18 wherein the optimal supporting locations are selected step-by-step.

20. The method according to claim 15 wherein
a) the cup contour is divided into at least two contour sections;
b) a number of the contour points serving as supporting locations is fixed;
c) a first selection of supporting locations is made;
d) a first spline function is calculated by the supporting locations of the first selection;
e) spacing errors between the calculated first spline function and the contour points of the corresponding contour section are determined;
f) the determined spacing errors are added up and the added spacing errors are kept as an error value of a first supporting location selection together with the first spline function;
g) a new selection of supporting locations is made;
h) a new spline function is calculated by the supporting locations of the new selection;
i) a new error value is determined for the new supporting location selection and is kept together with the new spline function;
j) the error values of the first and new supporting spot selection are compared to one another and a smallest error value is kept together with the corresponding spline function;
k) the steps g) to j) are repeated as long as the smallest error value is determined,
l) the spline function that belongs to the smallest error value is determined, and m) the spline functions of at least a few contour sections are consulted for determining the geometric dimensions of the cup.

21. A method for measuring cups given the engraving of printing forms in an electronic engraving machine, comprising the steps of:
engraving with an engraving member cups into a printing form, geometric dimensions of said cups representing actual hue values;
producing a video image of at least one engraved cup;
searching for a contour of the engraved cup in the video image;
determining geometric dimensions of the engraved cups by measuring and the cup contour and wherein in order to avoid erroneous measurements:
a) determining the contour points likely to be situated on a cup contour by a contour search in the video image,
b) simulating the cup contour by at least one spline function, calculated by contour points serving as supporting locations,
c) dividing the cup contour into at least two contour sections for each contour section,
d) fixing a number of contour points serving as supporting locations,
e) making a first selection of supporting locations,
f) calculating a first spline function by the supporting locations of the first selection,
g) determining spacing errors between the calculated first spline function and the contour points of the corresponding contour section,
h) adding up the determined spacing errors and the added spacing errors are kept as an error value of the first supporting location selection together with the first spline function,
i) making a new selection of supporting locations,
j) calculating a new spline function by the supporting locations of the new selection,
k) determining a new error value for the new supporting spot selection and keeping it together with the new spline function, l) comparing the error values of the first and new supporting location selection to one another and the smallest error value is kept together with the corresponding spline function, m) the steps g) to j) are repeated as long as the smallest error value is determined, n) determining the spline function that belongs to a smallest error value, and o) consulting the spline functions of at least a few contour sections for determining the geometric dimensions of the cup.

22. The method according to claim 21 wherein the supporting locations are selected such that they are equally spaced from one another given the first supporting location selection.

23. The method according to claim 21 wherein the error squares are utilized as error values.

24. The method according to claim 21 wherein at least one polynomial is used as a mathematical function for simulating a cup contour, and the polynomial is calculated upon utilization of contour points.

25. The method according to claim 21 wherein the dimensions of a cup to be determined are at least one of a transverse diagonal, a longitudinal diagonal, a through-cut, a web width, a cup surface and a cup volume.

26. The method according to claim 25 wherein the cup contour of a cup to be measured is simulated by two functions that are opposite to one another, and the transverse diagonal of the cup is determined at a location from a difference of function values of the two functions at the location.

27. The method according to claim 25 wherein the cup contour of a cup to be measured is simulated by two functions that are opposite to one another, and the longitudinal diagonal of the cup is determined from a distance of the intersecting points of the two functions.

28. The method according to claim 25 wherein the cup contour of a cup to be measured is simulated by two functions that are opposite to one another, and a through-cut is determined from a difference of minimal function values of the functions .

29. The method according to claim 25 wherein the cup contour of a cup to be measured is simulated by two functions that are opposite to one another, and a cup surface of the cup is determined as a surface being situated between the intersecting functions.

30. The method according to claim 25 wherein the cup contour of a cup to be measured is simulated by two functions that are opposite to one another, and the cup volume of the cup is determined from intersecting functions upon consideration of a cutting angle of an engraver of the engraving member.

31. The method according to claim 21, wherein the cups to be measured are cups that are engraved during a test engraving.

32. The method according to claim 31 wherein cups for at least one of the hue values "light", "dark"; and "middle hue" are engraved during the test engraving.

33. The method according to claim 21, wherein an engraving member is controlled by an engraving control signal, actual hue values, which are represented by the determined geometric dimensions of the cups are compared to prescribed set hue values, and adjustment values are derived from the comparison, whereby an engraving control signal is calibrated by said adjustment values such that the engraved actual hue values correspond to the actual hue values to be engraved.

34. A method for measuring cups given engraving of a printing form in an electronic engraving machine, comprising the steps of:

engraving with an engraving member cups into a printing form, geometric dimensions of said cups representing actual hue values;

producing a video image of at least one engraved cup;

searching for a contour of the engraved cup in the video image;

smoothing the cup contour found in the video image; and determining at least one geometric dimension of the cups on the basis of the smoothed cup contour in order to improve measurement.

* * * * *